Nov. 26, 1957 J. R. HOLLINS 2,814,668
VEHICLE LAMP MOUNTING
Filed Jan. 11, 1955
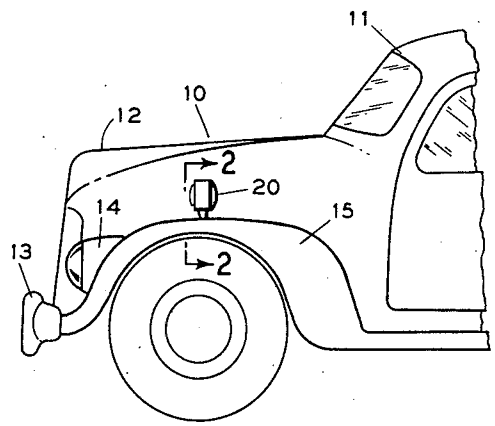
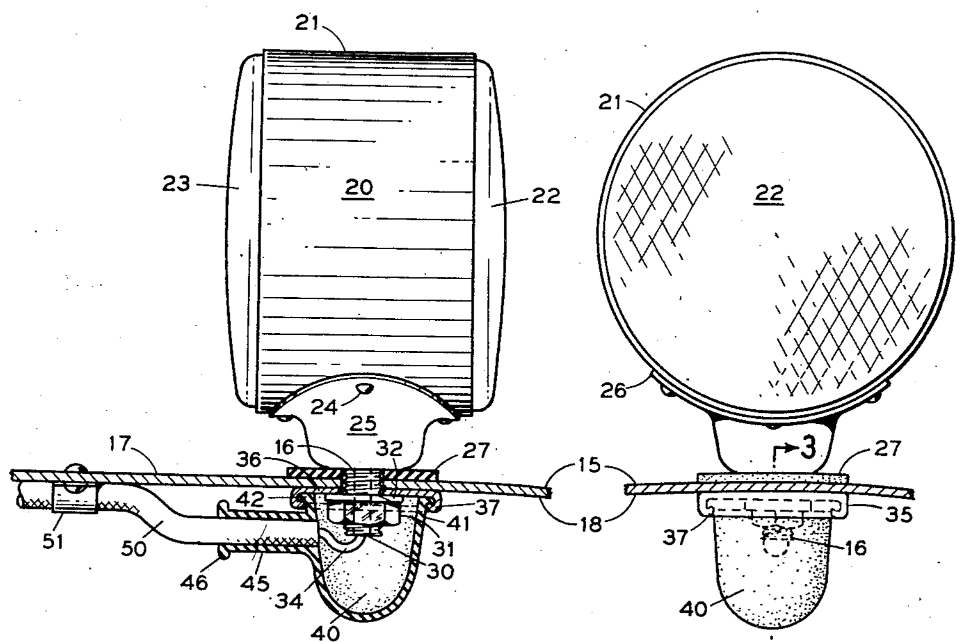
INVENTOR.
Jesse R. Hollins
BY
[signature]
his atty United States Patent Office 2,814,668
Patented Nov. 26, 1957

2,814,668

VEHICLE LAMP MOUNTING

Jesse R. Hollins, Brooklyn, N. Y.

Application January 11, 1955, Serial No. 481,242
1 Claim. (Cl. 174—138)

This invention relates to vehicle lamps and, more particularly, to a novel moisture-proof, grease-proof, and dirt-proof mounting for vehicle signal or marker lamps. The lamp mounting of this invention is an improvement on the lamp mounting disclosed in my copending application Serial No. 382,311, filed September 25, 1953.

In addition to the usual headlamps, parking lamps, tail lamps and license plate lamps, many vehicles are provided with additional signal or marker lamps. In the case of passenger vehicles, these lamps are usually recessed into the fenders or body so as to be substantially "flush mounted." However, on commercial vehicles, particularly the larger size trucks and tractor-trailer combinations, the signal and marker lamps are mounted in projecting relation on the fenders, body, or bumpers.

Generally, these truck-mounted signal or marker lamps comprise a lamp casing having a hollow, threaded mounting stud projecting therefrom. This stud is inserted through a mounting hole in the vehicle and secured in position by a nut and lock-washer assembly threaded onto the stud, a suitable gasket being interposed between the lamp casing and the vehicle outer surface. The hollow stud serves as a conduit for leading one or more circuit conductors into the lamp casing. Between the stud inner end and the lamp control switch, the conductors or cables are enclosed in a protective sleeve or tube of flexible construction, generally of woven fiber or the like.

The present mountings of such lamp are susceptible to the entrance of moisture, grease, dirt and the like into the protective sleeve and into the lamp casing through the hollow stud. The vulnerable point for entry of such foreign matter is at the juncture between the protective sleeve and the hollow stud. While attempts have been made to provide a sealed juncture between the sleeve and the stud, they have not been commercially satisfactory. Of course, such foreign matter has a deleterious effect on the lamp and its circuit conductors.

The present invention is directed to a novel, simple, and inexpensive sealed mounting for such lamps, providing a dust, moisture and grease sealed connection between the lamp mounting stud and the protective sleeve for the circuit conductor. To this end, a cup-shaped or dished washer, having a beaded inturned rim is mounted on the stud between the lock-washer and nut assembly and the underside of the vehicle lamp mounting surface. This cup-washer has an inner diameter sufficiently large to receive the lock-washer and nut and permit a socket wrench to be used on the nut. The base of the cup washer engages the vehicle mounting surface.

Associated with the cup washer is a sealing nipple or housing of flexible, resilient, elastic material, such as natural or synthetic rubber or the like. This nipple is generally cup shaped, and has a circumferential rim having an outer diameter greater than the inner diameter of the inturned rim on the dished washer, and substantially equal to the base diameter of the washer. This nipple is pressed into the dished washer, after the lamp has been secured to the mounting surface, so that the circumferential rim or flange snaps into the beaded inturned rim of the washer. A tight sealing enclosure is thus provided for the bolt lock washer and nut.

The sealing nipple has a tubular extension of reduced diameter projecting laterally therefrom, the inner diameter of such extension being less than the outer diameter of the protective sleeve for the circuit conductor. The sleeve is force-fitted into this elastic extension, thus providing a completely sealed connection between the lamp casing and the protective sleeve.

For an understanding of the invention principles, reference is made to the following description of a typical embodiment thereof as illustrated in the accompanying drawing.

In the drawing:

Fig. 1 is a partial side elevation view of a commercial motor vehicle having a signal or marker lamp mounted on a fender;

Fig. 2 is a transverse sectional view, on the line 2—2 of Fig. 1, illustrating in elevation the invention mounting seal; and Fig. 3 is a sectional view on the line 3—3 of Fig. 2.

Referring to Fig. 1, a commercial motor vehicle 10 is illustrated as having a cab 11, hood 12, bumper 13, a headlamp 14, and a left front fender 15 on which lamp 14 is mounted, preferably in flush relation. On the upper surface of fender 15, and projecting upwardly therefrom, is mounted a signal or marker lamp 20, the illustrated lamp 20 including a cylindrical lamp casing or housing 21 having a front aspect or lens 22 and a rear aspect or lens 23, as best seen in Fig. 3.

Secured to the underside of casing 21 by rivets 23 or the like is a cup shaped base 25, the base having a securing flange 26 conformingly fitting casing 21. Projecting axially from base 25 is a hollow threaded stud 30 arranged to be inserted through a mounting hole 16 in fender 15, a sealing washer or gasket 27 being interposed between base 25 and the outer surface 17 of fender 15. In the usual mounting arrangement, lamp 20 is secured in position by a nut 31 threaded on stud 30, a lock washer 32 being interposed between nut 31 and the undersurface 18 of fender 15. The conductor or cable 34 for one or more lamps mounted in casing 21 is brought out through stud 30.

In accordance with the present invention, this usual mounting arrangement is modified, as shown in Figs. 2 and 3, by interposing a relatively thin dished or cup-shaped metallic washer 35 between lock washer 32 and undersurface 18 of fender 15. Washer 35 has a base 36 engaging surface 18 and an axially projecting beaded over and inturned rim 37. The inner diameter of washer 35 is sufficiently large to receive a socket wrench or the like for tightening nut 31.

Associated with washer 35 is a generally cup shaped nipple 40, of flexible, resilient, and elastic material such as natural or artificial rubber or the like, having a rim portion 41 and a reduced extension 45 projecting laterally therefrom for a purpose to be described. Rim portion 41 has a circumferential flange 42 whose outer diameter is substantially equal to the inner diameter of beadable rim 37 of washer 35.

Extension 45 has a thickened rim or lip 46, and its inner diameter is preferably slightly less than the outer diameter of protective sleeve 50 for cable 35. Sleeve 50 is usually a flexible element of woven fiber or the like.

To assemble the invention mounting, gasket 27 is slipped over stud 30 and the stud is inserted through hole 16. Washer 35 and then lock-washer 32 are placed on stud 30 beneath fender 15, and nut 31 is threaded onto the stud to clamp the washers firmly against fender surface 18. Cable 34 is then threaded into nipple 40 and out through extension 45. Rim portion 41 of nipple 40 is then compressed into washer 35 so that flange 42 snaps into inturned rim 37 of the washer, making a tight seal between the mounting assembly, fender, and casing 21. Cable 34 is then threaded into sleeve 50 and the latter is forced into elastic extension 45 to form a tight seal between cable 50 and nipple 40. Sleeve 50 is then held against movement by a clamp 51 secured to fender 15.

Thus, a moisture, grease, and dust proof seal is provided between casing 21 and protective cable 50 in a simple, inexpensive, and effective manner.

While a specific embodiment of the invention has been shown and described in detail to illustrate the application of the invention principles, it will be understood that the invention may be embodied otherwise without departing from such principles.

What is claimed is:

A moisture, grease and dust-proof sealing arrangement for a motor-vehicle-surface mounted lamp of the type comprising a lamp casing having a hollow threaded mounting stud projecting therefrom to receive a securing nut; said arrangement comprising, in combination, a flat disk washer having a stud-receiving aperture and an outwardly projecting inturned circumferential rim; and a generally cup-shaped sealing nipple of elastic material seated against the base of said washer, said nipple having a circumferential flange at its seating end resiliently engaged within the washer rim, and being formed with a tubular lateral extension; the outer diameter of said circumferential flange being greater than the inner diameter of said inturned rim and substantially equal to the base diameter of said flat washer.

References Cited in the file of this patent

UNITED STATES PATENTS

| | | |
|---|---|---|
| 2,076,020 | Frasher | Apr. 6, 1937 |
| 2,281,643 | Wahlberg | May 5, 1942 |
| 2,468,225 | Murphy | Apr. 26, 1949 |
| 2,468,226 | Murphy | Apr. 26, 1949 |
| 2,690,541 | Elliott | Sept. 28, 1954 |

FOREIGN PATENTS

| | | |
|---|---|---|
| 1,001,694 | France | 1952 |